(12) United States Patent
Lenz et al.

(10) Patent No.: US 8,058,867 B2
(45) Date of Patent: Nov. 15, 2011

(54) SYSTEM FOR DETERMINING THE POSITION OF A MOVABLE MEMBER

(75) Inventors: James Edward Lenz, Fargo, ND (US); Nikolai R. Tevs, Fargo, ND (US)

(73) Assignee: Deere & Company, Moline, IL (US)

( * ) Notice: Subject to any disclaimer, the term of this patent is extended or adjusted under 35 U.S.C. 154(b) by 588 days.

(21) Appl. No.: 12/193,140

(22) Filed: Aug. 18, 2008

(65) Prior Publication Data

US 2010/0039103 A1 Feb. 18, 2010

(51) Int. Cl.
*G01B 7/14* (2006.01)
(52) U.S. Cl. .......... 324/207.24; 324/207.22; 324/207.15
(58) Field of Classification Search ............. 324/207.12, 324/207.2, 207.24, 207.25, 207.22, 207.15
See application file for complete search history.

(56) References Cited

U.S. PATENT DOCUMENTS

| | | |
|---|---|---|
| 3,502,966 A | 3/1970 | Perets et al. |
| 3,710,687 A | 1/1973 | Rench |
| 4,588,953 A | 5/1986 | Krage |
| 4,747,215 A | 5/1988 | Waikas |
| 5,103,172 A | 4/1992 | Stoll |
| 5,115,195 A | 5/1992 | Peterson et al. |
| 5,201,838 A | 4/1993 | Roudaut |
| 5,216,364 A | 6/1993 | Ko et al. |
| 5,359,288 A | 10/1994 | Riggs et al. |
| 5,608,317 A | 3/1997 | Hollmann |
| 5,670,876 A | 9/1997 | Dilger et al. |
| 5,742,161 A | 4/1998 | Karte |
| 5,905,215 A | 5/1999 | Jin et al. |
| 5,952,823 A | 9/1999 | Nyce et al. |
| 5,998,991 A | 12/1999 | Begin |
| 6,018,241 A | 1/2000 | White et al. |
| 6,175,233 B1 | 1/2001 | McCurley et al. |
| 6,211,794 B1 | 4/2001 | DeSoto |
| 6,215,299 B1 | 4/2001 | Reynolds et al. |
| 6,253,460 B1 | 7/2001 | Schmitz |
| 6,393,963 B1 | 5/2002 | Kadlicko |
| 6,401,883 B1 | 6/2002 | Nyce et al. |
| 6,690,160 B2 | 2/2004 | Gray et al. |
| 6,922,158 B2 | 7/2005 | Ymker |
| 6,989,669 B2 | 1/2006 | Low et al. |
| 7,034,527 B2 | 4/2006 | Low et al. |
| 2001/0035749 A1 | 11/2001 | Nekado |
| 2001/0038281 A1 | 11/2001 | Nyce et al. |
| 2001/0052771 A1 | 12/2001 | Jagiella |
| 2003/0169033 A1 | 9/2003 | Tromblee et al. |
| 2004/0263155 A1 | 12/2004 | Schroeder et al. |
| 2005/0258825 A1 | 11/2005 | Masuda et al. |

(Continued)

FOREIGN PATENT DOCUMENTS

DE 10020764 1/2001

(Continued)

*Primary Examiner* — Reena Aurora

(57) ABSTRACT

A first magnet is secured to the movable member at a first axial position and is associated with a first magnetic field. A secondary magnet is secured to the movable member at a secondary axial position and is associated with a secondary magnetic field. A sensor assembly comprises magnetic sensors arranged in an array (e.g., on a fixed member). A first magnetic sensor is spaced apart from the sensor assembly such that the first magnetic sensor detects the first magnetic field of the first magnet in a first state and an absence of or change in the first magnetic field in a second state. A data processor is arranged for determining an axial position of the moveable member based on at least one of the magnetic fields sensed by the sensor assembly.

13 Claims, 4 Drawing Sheets

U.S. PATENT DOCUMENTS

2007/0273364 A1   11/2007   Takei et al.

FOREIGN PATENT DOCUMENTS

| | | |
|---|---|---|
| DE | 10119941 | 10/2002 |
| EP | 0618373 | 10/1994 |
| EP | 1166295 | 6/2005 |
| GB | 2096421 | 10/1982 |
| GB | 2108678 | 5/1983 |
| JP | 08240132 | 9/1996 |
| WO | 87/06656 | 11/1987 |
| WO | 92/11510 | 7/1992 |
| WO | 00/58976 | 10/2000 |
| WO | 02/086330 | 10/2002 |

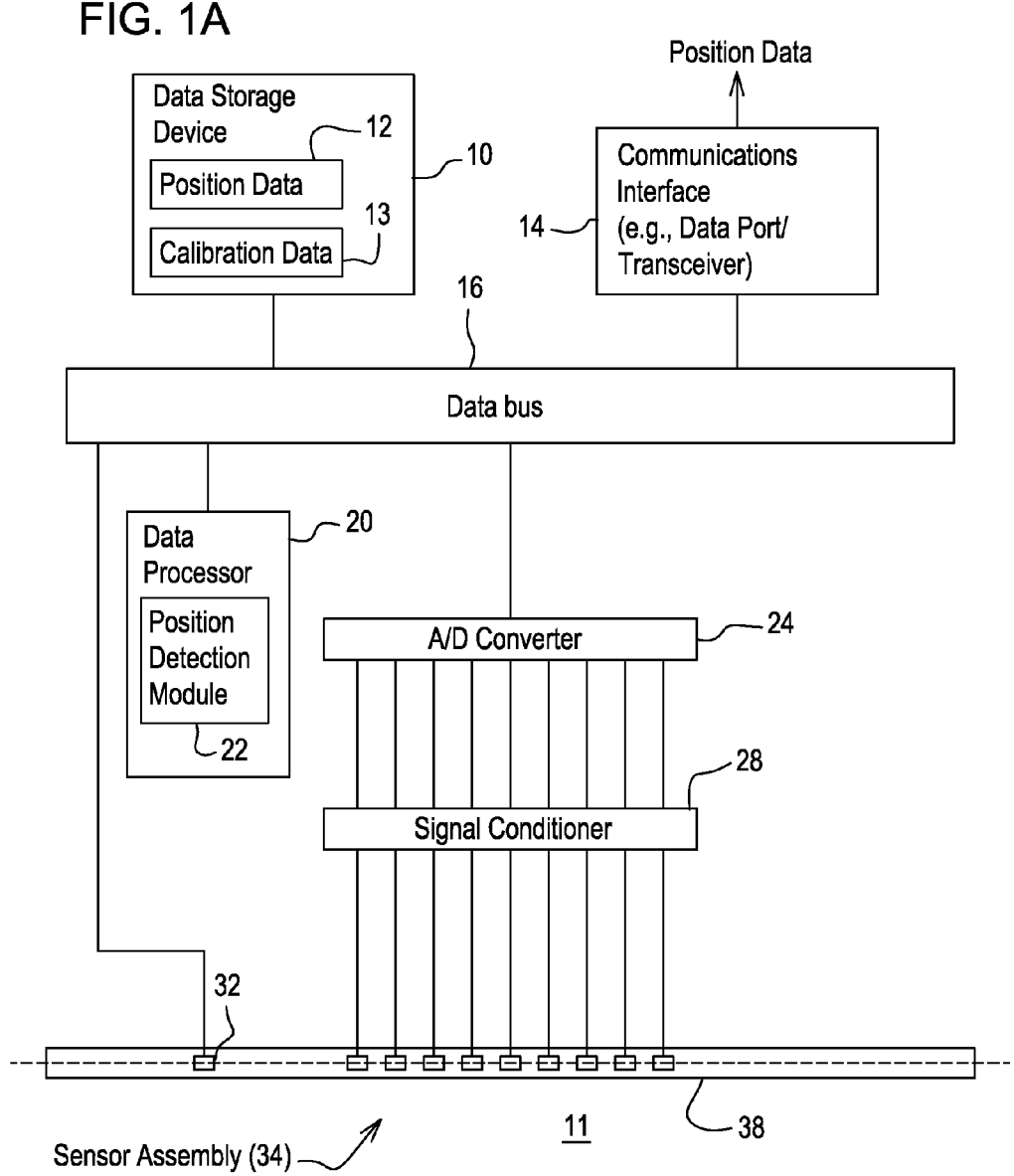
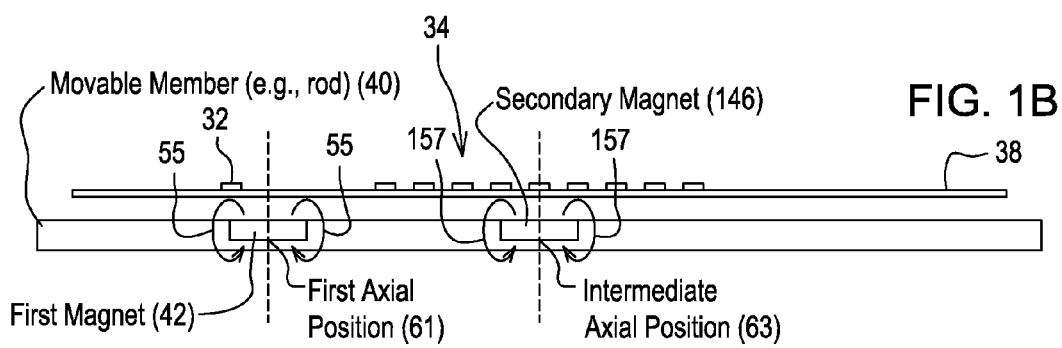

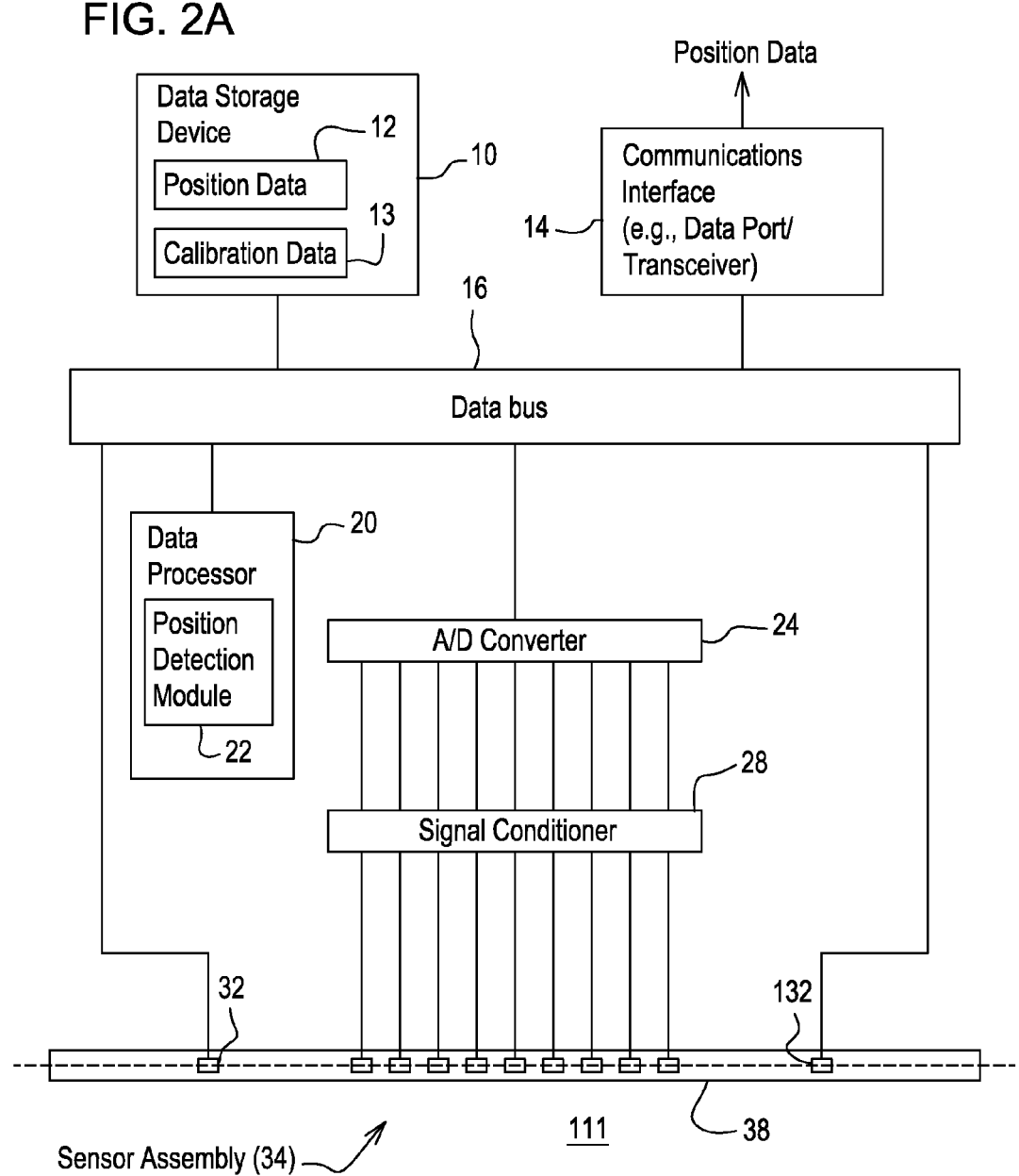
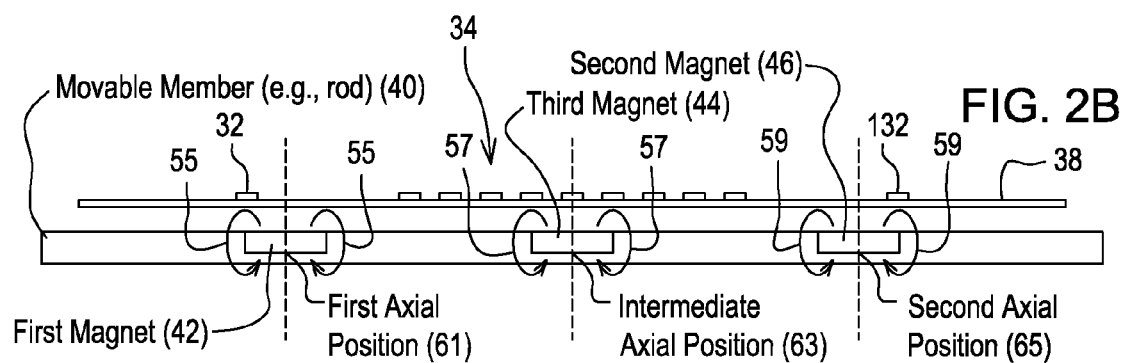

SYSTEM FOR DETERMINING THE POSITION OF A MOVABLE MEMBER

FIELD OF THE INVENTION

This invention relates to a system for determining the position of a movable member.

BACKGROUND OF THE INVENTION

A position sensor may detect the position of a movable member. For example, the position sensor may detect the position of a movable rod, piston, or another movable member with respect to a cylinder (e.g., hydraulic cylinder). The detected position may provide feedback, indirectly or directly, to an actuator associated with the movable member to precisely control the position or movement of the movable member at a corresponding time. The precision or accuracy of the position sensor may be degraded by any of the following factors: environmental stress, thermal stress, shock and vibration, and aging of components of the position sensor. Therefore, there is a need for a position sensor that determines the position of a movable member with enhanced precision or accuracy that addresses one or more of the above factors.

SUMMARY OF THE INVENTION

A system for determining the position of a movable member with respect to a fixed member comprises a movable member capable of axial movement within a range of axial positions. A first magnet is secured to the movable member at a first axial position and is associated with a first magnetic field. A secondary magnet is secured to the movable member at a secondary axial position and is associated with a secondary magnetic field. A sensor assembly comprises magnetic sensors arranged in an array (e.g., on a fixed member). A first magnetic sensor is spaced apart from the sensor assembly such that the first magnetic sensor detects the first magnetic field of the first magnet in a first state and an absence of or change in the first magnetic field in a second state. A data processor is arranged for determining an axial position of the moveable member based on at least one of the first magnetic field and the secondary magnetic field sensed by the sensor assembly.

BRIEF DESCRIPTION OF THE DRAWINGS

FIG. 1A is a block diagram of one embodiment of a system for determining the position of a movable member.

FIG. 1B is an illustration of a side view of movable member and various magnetic field sensors in accordance with the embodiment of FIG. 1A.

FIG. 2A is a block diagram of one embodiment of a system for determining the position of a movable member.

FIG. 2B is an illustration of a side view of movable member and various magnetic field sensors in accordance with the embodiment of FIG. 2A.

DESCRIPTION OF THE PREFERRED EMBODIMENT

Figure 3:
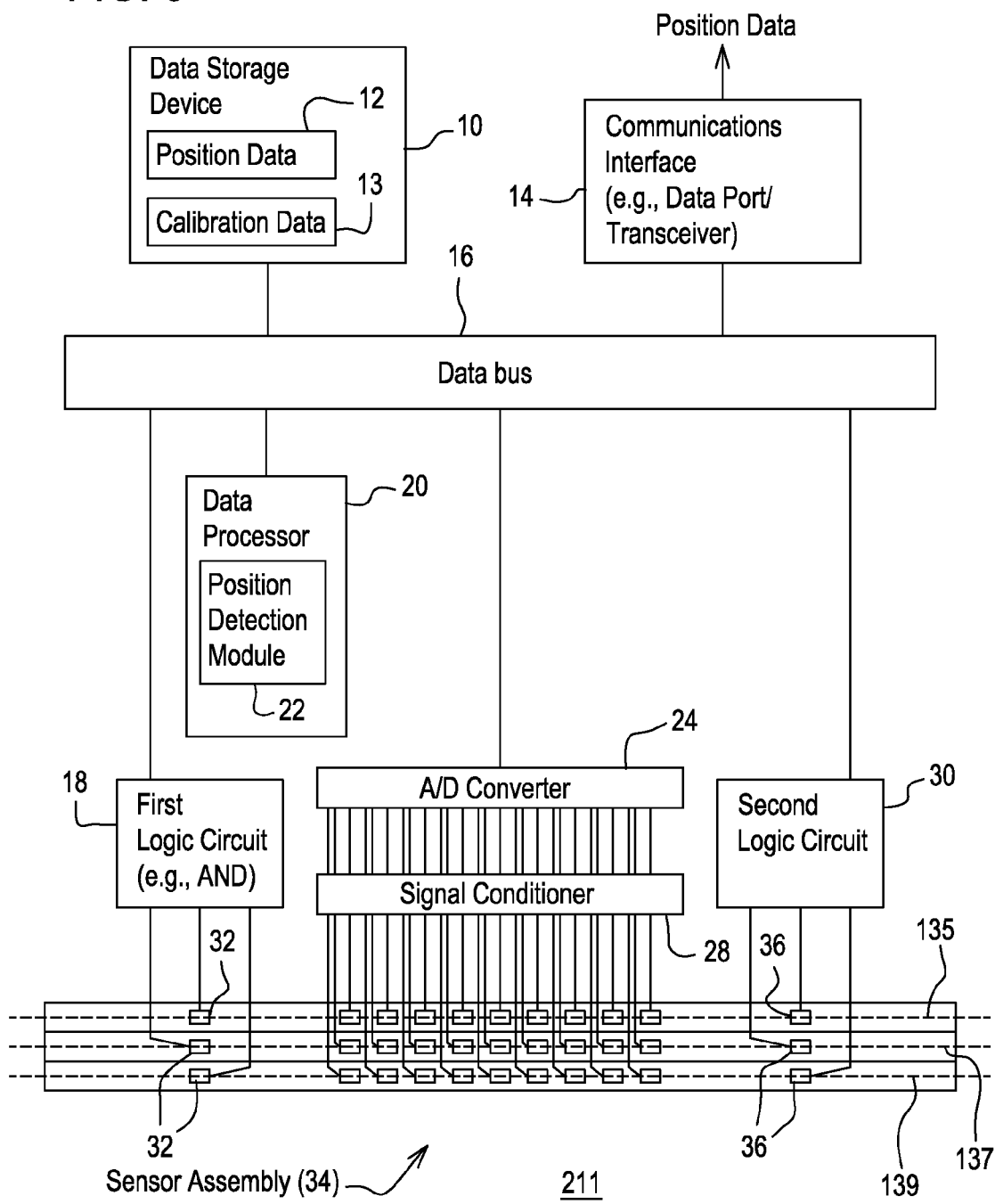
FIG. 3 is a block diagram of another embodiment of a system for determining the position of a movable member.

In accordance with one embodiment of the invention, FIG. 1A and FIG. 1B show a system 11 for determining the position of a movable member 40 (in FIG. 1B) with respect to a stationary or fixed member 38. In FIG. 1B, a first magnet 42 and a secondary magnet 146 are secured to the movable member 40 and spaced apart from one another.

In FIG. 1A, the position detection system 11 comprises a group of magnetic field sensors: a first magnetic sensor 32 and a sensor assembly 34. The first magnetic sensor 32 may be coupled to a data bus 16. The sensor assembly 34 has one or more sensor outputs coupled to a signal conditioner 28. The signal conditioner 28 is coupled to an analog-to-digital converter 24. In turn, the analog-to-digital converter 24 is coupled to a data bus 16.

A data processor 20 can communicate with one or more of the following components via the data bus 16: the first magnetic sensor 32, the analog-to-digital converter 24, a data storage device 10 and a communications interface 14. As illustrated in FIG. 1A, the data processor 20, the data storage device 10, and the communications interface 14 are coupled to the data bus 16. The data processor 20 comprises a position detection module 22. The data storage device 10 may store position data 12 or calibration data 13, or both, determined by the data processor 20 or position detection module 22.

The first magnetic sensor 32 may comprise one or more of the following: a digital magnetic field sensor, an analog magnetic field sensor with an integrated analog-to-digital converter 24, a magneto-resistive sensor, Hall-effect sensor, a linear position magnetic sensor, or an angular position magnetic sensor. In one embodiment, a digital magnetic field sensor has one of two discrete states or output levels. For example, the output levels (e.g., voltage levels or logic levels) may represent a low logic level (e.g., 0) or a high logic level (e.g., 1). In one configuration, the output level of the first magnetic sensor 32 provides a signal or data output that indicates whether or not a magnet (e.g., first magnet 42 or secondary magnet 146) of the movable member 40 is in close proximity to the first magnetic sensor 32. The data output of the first magnetic sensor 32 may be used to determine the direction of displacement of the movable member 40 or whether the axial position or positions detected by the sensor assembly 34 are within a first range of axial positions or a second range of axial positions. The first range of axial positions are generally distinct from the second range of axial positions, although the two ranges may be contiguous or overlapping, where overlapping provides additional redundancy and potential increased accuracy.

In a first exemplary configuration, the first magnetic sensor 32 has a digital output, where a first state indicates that a magnetic field (e.g., first magnetic field 55 of a first magnet 42) meets or exceeds a threshold magnetic field strength, and where a second state indicates that the magnetic field (e.g., the first magnetic field 55) is less than the threshold magnetic field strength or that no detectable magnetic field is present.

In a second exemplary configuration, the first magnetic sensor 32 has a first state indicative of movement of the movable member 30 in one direction (e.g., a known direction) of displacement of the movable member 40. The direction of displacement may be known based on the configuration (e.g., separation and position) of the magnets on the movable member 40, for example.

The sensor assembly 34 comprises an array of magnetic field sensors secured to a fixed member 38. For example, the sensor assembly 34 comprises a generally linear array of magnetic field sensors, where each sensor is separated from an adjacent sensor by a known or fixed interval. Each magnetic field sensor within the sensor array or sensor assembly 34 may comprise an analog sensor, a magneto-resistive sensor, a Hall-effect sensor, a linear position magnetic sensor, or an angular position magnetic sensor. In one embodiment, the output of each analog sensor is proportional to the magnetic field (e.g., from one or more magnets 42 or 146 on the rod) and can be used to determine a position of the movable member 40 with a resolution that is much smaller than the distance between two sensors (e.g., typically 50 micrometers for a 10 mm pitch) within the sensor assembly 34 on the movable member.

In one embodiment, the signal conditioner 28 has conditioner inputs for receiving sensor data from each magnetic sensor in the sensor assembly 34. The signal conditioner 28 may provide one or more of the following: (a) amplification (e.g., or attenuation) of the sensor signals of the sensor assembly 34 by a target amplification level, to a target signal level or to a target signal level range, (b) filtering noise from the sensor signals of the sensor assembly 34, and (c) biasing the sensors of the sensor assembly 34 in an appropriate mode (e.g., in a saturation mode or with an appropriate level of direct current (DC) bias). The signal conditioner output is coupled to the input of the analog-to-digital converter 24.

The analog-to-digital converter 24 converts any analog signals provided by the sensor assembly 34 to digital signals that can be communicated to the data processor 20 via the data bus 16. In an alternate embodiment, the analog-to-digital converter 24 may be deleted, where the sensor assembly uses digital sensors with digital signal output (e.g., transistor-to-transistor logic level (TTL) output).

The data processor 20 comprises a microprocessor, a microcontroller, a programmable logic array, a logic circuit, an application specific integrated circuit (ASIC), or another device for processing data. The data processor 20 further comprises a position detection module 22. The position detection module 22 may comprise a look-up table, a logic circuit, an equation, or software instructions for determining a position of the movable member 40 with respect to a reference position or fixed member 38. For example, the look-up table may comprise input data and a corresponding output data, where the input data comprises a state of the first magnetic sensor 32, states or levels of the sensor assembly 34, or states or levels associated with sensors within the sensor assembly 34 and where the output data comprises a position of the movable member 40 with respect to a reference position.

The data storage device 10 may comprise a magnetic storage device, an optical storage device, electronic memory, a hard disk drive, an optical disk drive, a floppy disk drive, non-volatile random access memory or another device for storing digital data. The data storage device 10 facilitates the storage and retrieval of digital data.

The communications interface 14 may comprise a data port, an input/output port, a transceiver or another device for facilitating communication of position data 12 to a controller or another device. The communications interface 14 may provide an interface to a vehicular data bus, such as CAN (Controller Area Network) data bus, an Ethernet databus, or the like.

For small axial displacements of the movable member 40 in a direction from an intermediate position (e.g., as illustrated in FIG. 1B), the output of the first magnetic sensor 32 is a first state (e.g., high logic level or one) and secondary magnet 146 is aligned with (or faces) at least part of the sensor assembly 34 and the secondary magnetic field 157 is used for fine position calculations. For sufficient displacement of the movable member 40 toward the right in FIG. 1B, the output of the first magnetic sensor 32 is generally at or approaching a second state (e.g., low level), distinct from the first state. Accordingly, the output level or state of the first magnetic sensor 32 indicates whether the movable member 40 has moved in a first range of axial positions or to a second range of axial positions. The first range of axial positions is indicated by the first state of the first sensor 32, whereas the second range of axial positions is indicated by the second state of the first sensor 32. Meanwhile, the data processor 20 or position detection module 22 uses sensor data from the sensor assembly 34 to determine the exact or fine position of the movable member 40 (e.g., with respect to a fixed member 38).

In one embodiment, the total length of the sensor assembly 34 and the distance between the magnets determine the maximum displacement of movement (e.g., maximum axial displacement) of the movable member 40 that can be measured. For example, the total length of the sensor assembly 34 is based on the linear distance or separation between the outermost sensors that comprise the sensor assembly 34. The spacing or pitch between the adjacent sensors in the array (of the sensor assembly 34) is proportional to or commensurate with the resolution (e.g., maximum resolution) of the determined position. Here, an illustrative pitch or spacing of approximately 10 mm between sensors in the array may support determination of resolution with approximately 50 micrometer accuracy, for instance.

The magnetic field (e.g., first magnetic field 55 or secondary magnetic field 157) of a single magnet (e.g., first magnet 42 or secondary magnet 146) may be measured by multiple sensors in the sensor assembly 34 simultaneously to produce a target level of accuracy and reliability in the determined position of the movable member 40. Each of the sensors in the sensor assembly 34 may detect the magnitude of the magnetic field, the direction or angle of the magnetic field, or both. The data processor 20 may evaluate the magnitude of the magnetic field detected at each sensor in the array, the angle or direction of the magnetic field, or both as input. The data processor 20 may derive the axial position of the movable member 40 from an equation, a look-up table, a chart, a database or another technique based on the magnitude of the magnetic field, the angle of the magnetic field, or both.

For example, the data processor 20 may store reference magnitude data, reference angular data, or both on the detected or received magnetic field (composed of the relative contributions from fields 55 and 157) for each sensor in the assembly 34 at a variety of known or incremental axial positions of the movable member 40 with respect to the fixed member 38. The reference magnitude data, reference angular data, or both may be referred to as position data 12 or reference position data. The data processor 20 can determine a position of the movable member 40 by searching for a match or closest match of the detected magnitude data, detected angular data, or both on magnetic fields (for each sensor in the sensor assembly 34) with the reference magnitude data, reference angular data, or both for corresponding known axial positions of the movable member 40 with respect to the fixed member 38.

The first magnetic sensor 32 supports a reduction in the number of sensors (e.g., analog sensors) within the sensor assembly 34 that might be otherwise required to achieve a comparable resolution (e.g., 50 micrometer resolution where the pitch or separation between adjacent sensors in the array is approximately 10 mm) in position determination. The sensors in the sensor assembly 34 are readily operated in the saturated mode readout method to reduce the sensitivity to temperature and vibration effects. Further, by sensing magnetic fields, the sensing system 11 does not have contacting parts that might be disrupted, misaligned, or improperly calibrated because of radial gap variation, fabrication tolerances or wear.

The position detection system 111 of FIG. 2A and FIG. 2B is similar to the position detection system 11 of FIG. 1A and FIG. 1B, except the position system 111 further comprises a second magnetic sensor 132 and a total of three magnets secured to the movable member 40. For the position detection system 111, the three magnets shown in FIG. 2B shall be referred to as the first magnet 42, the second magnet 46 and the third magnet 44. As shown, the first magnet 42 is positioned at a first axial position; the second magnetic 46 is positioned at a second axial position 65; the third magnet 44 is positioned at an intermediate axial position 63. Like reference numbers in FIG. 1A, FIG. 1B, FIG. 2A and FIG. 2B indicate like elements.

In accordance with one embodiment of the invention, FIG. 2A and FIG. 2B show a system 111 for determining the position of a movable member 40 (FIG. 2B) with respect to a stationary or fixed member 38. In FIG. 2B, the first magnet 42, the second magnet 46 and the third magnet 44 are secured to the movable member 40 and spaced apart from each other.

The position detection system 111 comprises a group of magnetic field sensors: a first magnetic sensor 32, a second magnetic sensor 132, and a sensor assembly 34. The first magnetic sensor 32 and the second magnetic sensor 132 may be coupled to a data bus 16. The sensor assembly 34 has a sensor output coupled to a signal conditioner 28. The signal conditioner 28 is coupled to an analog-to-digital converter 24. In turn, the analog-to-digital converter 24 is coupled to a data bus 16.

A data processor 20 can communicate with one or more of the following components via the data bus 16: the first magnetic sensor 32, the second magnetic sensor 132, the analog-to-digital converter 24, a data storage device 10 and a communications interface 14. As illustrated in FIG. 2A, the data processor 20, the data storage device 10, and the communications interface 14 are coupled to the data bus 16. The data processor 20 comprises a position detection module 22. The data storage device 10 may store position data 12 or calibration data 12, or both, determined by the data processor 20 or position detection module 22.

The first magnetic sensor 32 and the second magnetic sensor 132 each may comprise one or more of the following: a digital magnetic field sensor, an analog magnetic field sensor with an integrated analog-to-digital converter 24, a magneto-resistive sensor, a Hall-effect sensor, a linear position magnetic sensor, or an angular position magnetic sensor. In one embodiment, the digital magnetic field sensors have one of two discrete states or output levels. For example, the output levels (e.g., voltage levels or logic levels) may represent a low logic level (e.g., 0) or a high logic level (e.g., 1). In one configuration, the output level of the first magnetic sensor 32 provides a signal or data output that indicates whether or not a magnet (e.g., 42, 44 or 46) on the movable member 40 is in close proximity to the first magnetic sensor 32. Similarly, the output level of a second magnetic sensor 132 provides a signal or data output that indicates whether or not a magnet (e.g., 42, 44 or 46) on the movable member 40 is in close proximity to the second magnetic sensor 132. Accordingly, the data output of the first magnetic sensor 32, the second magnetic sensor 132, or both, may be used to determine the direction of displacement of the movable member 40 (e.g., from an intermediate axial position 63 or another reference point). If the magnetic field of at least one magnet (e.g., 55, 57, or 59) is received or detected with sufficient field strength for at least some sensors (e.g., analog sensors) within the sensor assembly 34, the sensor assembly 34 provides position data (e.g., or fine position data).

In a first exemplary configuration, the first magnetic sensor 32 has an output (e.g., a digital output), where a first state (e.g., high logic level) indicates that a magnetic field (e.g., first magnetic field 55 of a first magnet 42) meets or exceeds a threshold magnetic field strength, and where a second state (e.g., low logic level) indicates that a magnetic field less than the threshold magnetic field strength is present or no detectable magnetic field is present. Conversely, the second magnetic sensor 132 has an output (e.g., a digital output), where a first state indicates that a magnetic field (e.g., second magnetic field 59 of a second magnet 46) meets or exceeds a threshold magnetic field strength, and where a second state indicates that a magnetic field less than the threshold magnetic field strength is present or that no detectable magnetic field is present In a second exemplary configuration, the first magnetic sensor 32 and the second magnetic sensor 132 have a first group of states indicative of one direction of displacement of the movable member 40; the first magnetic sensor 32 and the second magnetic sensor 132 have a second group of states indicative of an opposite direction of displacement of the movable member 40, where the first group and the second group are distinct from each other. For example, if the movable member 40 is moved to the left in FIG. 2B, the first group of states may comprise the first magnetic sensor 32 having a first state (e.g., high logic level) and the second magnetic sensor 132 having a second state (e.g., low logic level), distinct from or opposite of the first state. Similarly, if the movable member 40 is moved to the right in FIG. 2B, the second group of states may comprise the first magnetic sensor 32 having a second state (e.g., low logic level) and the second magnetic sensor 132 having a first state (e.g., high logic level), distinct from or opposite of the second state.

The sensor assembly 34 comprises an array of magnetic field sensors. For example, the sensor assembly 34 comprises a generally linear array of magnetic field sensors, where each sensor is separated from an adjacent sensor by a known or fixed interval. Each magnetic field sensor within the sensor array may comprise an analog sensor, a magneto-resistive sensor, a Hall-effect sensor, a linear position magnetic sensor, or an angular position magnetic sensor. The output of each analog sensor is proportional to the magnetic field (e.g., from the magnets moving on the rod) and can be used to determine a position of the movable member 40 with a resolution that is much smaller than the distance between two sensors (e.g., typically 50 micrometers for a 10 mm pitch) on the movable member 40.

In one embodiment, the signal conditioner 28 has conditioner inputs for receiving sensor data from each magnetic sensor in the sensor assembly 34. The signal conditioner 28 is coupled to the analog-to-digital converter 24. The analog-to-digital converter 24 is coupled to a data bus 16.

The data processor 20 comprises a microprocessor, a microcontroller, a programmable logic array, a logic circuit, an application specific integrated circuit (ASIC), or another device for processing data. The data processor 20 further comprises a position detection module 22. The position detection module 22 may comprise a look-up table, a logic circuit, an equation, or software instructions for determining a position of the movable member 40 with respect to a reference position or fixed member 38. For example, the look-up table may comprise input data and a corresponding output data, where the input data comprises a state of the first magnetic sensor 32, a state of the second magnetic sensor 132, and levels (e.g., magnetic field strengths or angular orientation of magnetic fields) associated with the sensor assembly 34 and where the output data comprises a position of the movable member 40 with respect to a reference position.

The position sensing system 111 of FIG. 2A and FIG. 2B may support up to three ranges of axial displacements of the movable member 40 with respect to a fixed member 38. The three ranges may be contiguous or the ranges may overlap. For a primary range of small axial displacements of the movable member 40 in a direction from an intermediate axial position 63, the output of the first magnetic sensor 32 is a first state (e.g., high logic level or one) and the second sensor is at a first state (e.g., a high logic level or one); the intermediate magnet or third magnet 44 is aligned with (or faces) at least a portion of (e.g., some sensors in) the sensor assembly 34 and the third magnetic field 57 is used by the sensor assembly 34 and the data processor 20 for fine position calculations.

For a secondary range of displacements of the movable member 40 toward the first magnetic sensor 32 (or to the left as illustrated in FIG. 2B), the output of the first magnetic sensor 32 is generally at or approaching a first state (e.g., high level or one), whereas the output of the second magnetic sensor 132 is generally at a second state (e.g., low level), distinct from the first state. For the secondary range (e.g., where the movable member 40 is shifted slightly to the left, such that the second sensor 132 is no longer aligned with the second axial position 65) the second magnetic field 59 of the second magnet 46 is detected by one or more sensors of the sensor assembly 34 and the third magnetic field 57 of the third magnet 44 is detected by the first magnetic sensor 32.

For a tertiary range of displacements of the movable member 40 toward the second magnetic sensor 132 (or the right as illustrated in FIG. 2B), the output of the second magnetic sensor 132 is generally at or approaching a first state (e.g., high level), whereas the output of the first magnetic sensor 32 is generally at a second state (e.g., low level), distinct from the first state. For the tertiary range (e.g., where the movable member 40 is shifted slightly to the right such that the first sensor 321 is no longer aligned with the first axial position 61) the first magnetic field 55 of the first magnet 42 is detected by one or more sensors of the sensor assembly 34 and the third magnetic field 57 of the third magnet 44 is detected by the second magnetic sensor 132. Accordingly, the output level or states of the first magnetic sensor 32 and the second magnetic sensor 132 collectively indicate whether the movable member 40 has moved to the left, right (e.g., in a secondary or tertiary range, respectively) or remains within a range of an intermediate position (e.g., centered or initial position).

The first magnetic sensor 32 and the second magnetic sensor 132 facilitate the determination of the direction of movement of the movable member 40. In contrast, the sensor assembly 34 provides information associated with determining a position (e.g., a fine or precise position) of the movable member 40 with respect to the fixed member 38. The total length of the sensor assembly 34 (or its sensors) and the distance between the first and second magnets determine the maximum displacement or movement (e.g., maximum axial displacement) of the movable member 40 that can be measured.

The spacing or pitch between the adjacent sensors in the array of the sensor assembly 34 is proportional to or commensurate with the resolution (e.g., maximum resolution) of the determined position. For example, although other configurations are possible and fall within the scope of the claims, if the sensor assembly 34 comprises seven sensors (e.g., analog magneto-resistive sensors) spaced apart by a pitch of 10 mm, the sensing system 11 may be used to determine position over approximately 70 mm. Further, the resolution of the determined position will be commensurate or proportional to the spacing or pitch between the sensors. Here, an illustrative pitch or spacing of approximately 10 mm between sensors in the array may support determination of resolution with approximately 50 micrometer accuracy.

The magnetic field of one or more magnets (e.g., the third magnetic field 57 of the third magnet 44) may be measured by multiple sensors in the sensor assembly 34 simultaneously to produce such accuracy. Each of the sensors in the sensor assembly 34 may detect the magnitude of the detected magnetic field, the direction or angle of the detected magnetic field, or both. The detected magnetic field may comprise contributions from one or more of the following: the first magnetic field 55, the second magnetic field 59 and the third magnetic field 57. The data processor 20 may evaluate the magnitude of the detected magnetic field that is detected at each sensor in the array of sensors within the sensor assembly 34, the angle or direction of the magnetic field, or both as input data.

The data processor 20 may derive the axial position of the movable member 34 from an equation, a look-up table, a chart, a database or another technique based on the foregoing input data. For example, the data processor 20 may store reference magnitude data, reference angular data, or both on the magnetic field for each sensor in the assembly 34 at a variety of known or incremental axial positions of the movable member 40 with respect to the fixed member 38. The data processor 20 can identify a position of the movable member 40 by searching for a match or general equivalence (e.g., within a certain target tolerance) of the detected magnitude data, angular data, or both on magnetic fields (for each sensor in the sensor assembly 34) with the reference magnitude data, reference angular data, or both for corresponding known axial positions of the movable member 40 with respect to the fixed member 38.

The first magnetic sensor 32 and the second magnetic sensor 132 support a reduction in the number of analog sensors within the sensor assembly 34 that might be otherwise required to achieve a comparable resolution (e.g., 50 micrometer resolution where the pitch or separation between adjacent sensors in the array is approximately 10 mm) in position determination. The sensors in the sensor assembly 34 are readily operated in the saturated mode readout method to reduce the sensitivity to temperature and vibration effects. Further, by sensing magnetic fields, the sensing system 11 does not have contacting parts that might be disrupted, misaligned, or improperly calibrated because of radial gap variation, fabrication tolerances or wear.

The sensing system 211 of FIG. 3 is similar to the sensing system 111 of FIG. 2A and FIG. 2B, except the sensing system 211 of FIG. 3 further comprises a first logic circuit 18, a second logic circuit 30, and multiple rows (e.g., three rows) of first magnetic sensors 32, second magnetic sensors 132 and sensor assemblies 34. Like reference numbers in FIG. 2A, FIG. 2B and FIG. 3 indicate like elements.

In FIG. 3, there are three rows (135, 137, and 139) or strips of first magnetic sensors 32, second magnetic sensors 32 and sensor assemblies 34. However, in alternate embodiments two or more rows of first magnetic sensors 32, second magnetic sensors 132 and sensor assemblies 34 may be used. Multiple rows of first magnetic sensors 32, second magnetic sensors 32 and sensor assemblies are well-suited for enhancing reliability and providing redundancy to protect against circuitry or sensor failure of the first magnetic sensors 32, the second magnetic sensors 132, and sensors within the sensor assemblies 34. Here, the multiple rows are referred to as a first row 135, a second row 137, and a third row 139.

As shown, the first magnetic sensors 32 are coupled to a first logic circuit 18. The second magnetic sensors 32 are coupled to a second logic circuit 30. Each sensor assembly 34 is coupled to a signal conditioner 28.

In one embodiment, each logic circuit (18, 30) may comprise an AND, NAND, NOR, OR gate or another logic function. For example, if the first logic circuit 18 comprises a multiple input AND gates, each of the first sensor assemblies 32 must provide the same input to produce a desired logic level (e.g., high or logic level 1) at the output of the first logic circuit 18. Similarly, if the second logic circuit 30 comprises a multiple input AND gates, each of the second sensor assemblies 132 must provide the same input to produce a desired logic level (e.g., high or logic level 1) at the output of the second logic circuit 30.

In an alternate embodiment, the first logic circuit 18 and the second logic circuit 30 may be omitted, such that the first magnetic sensors 32 are coupled, directly or indirectly, to the data bus 16 and such that the second magnetic sensors 132 are coupled, directly or indirectly, to the data bus 16.

The data processor 20 or position detection module 22 may determine the position of the movable member even if only one row (135, 137 or 139) of sensors is functioning or if only one first sensor 32, one second sensor 36 and a single sensor assembly 34 from multiple rows is functioning. If multiple rows are functioning (135, 137 and 139), the position determination module may determine a mean or average position based on sensor readings from multiple rows (135, 137 and 139). Accordingly, the redundancy afforded by multiple rows of sensors (e.g., 32, 132 and 34) provides increased reliability and immunity against mechanical shock, vibration, and thermal stress.

Figure 4:
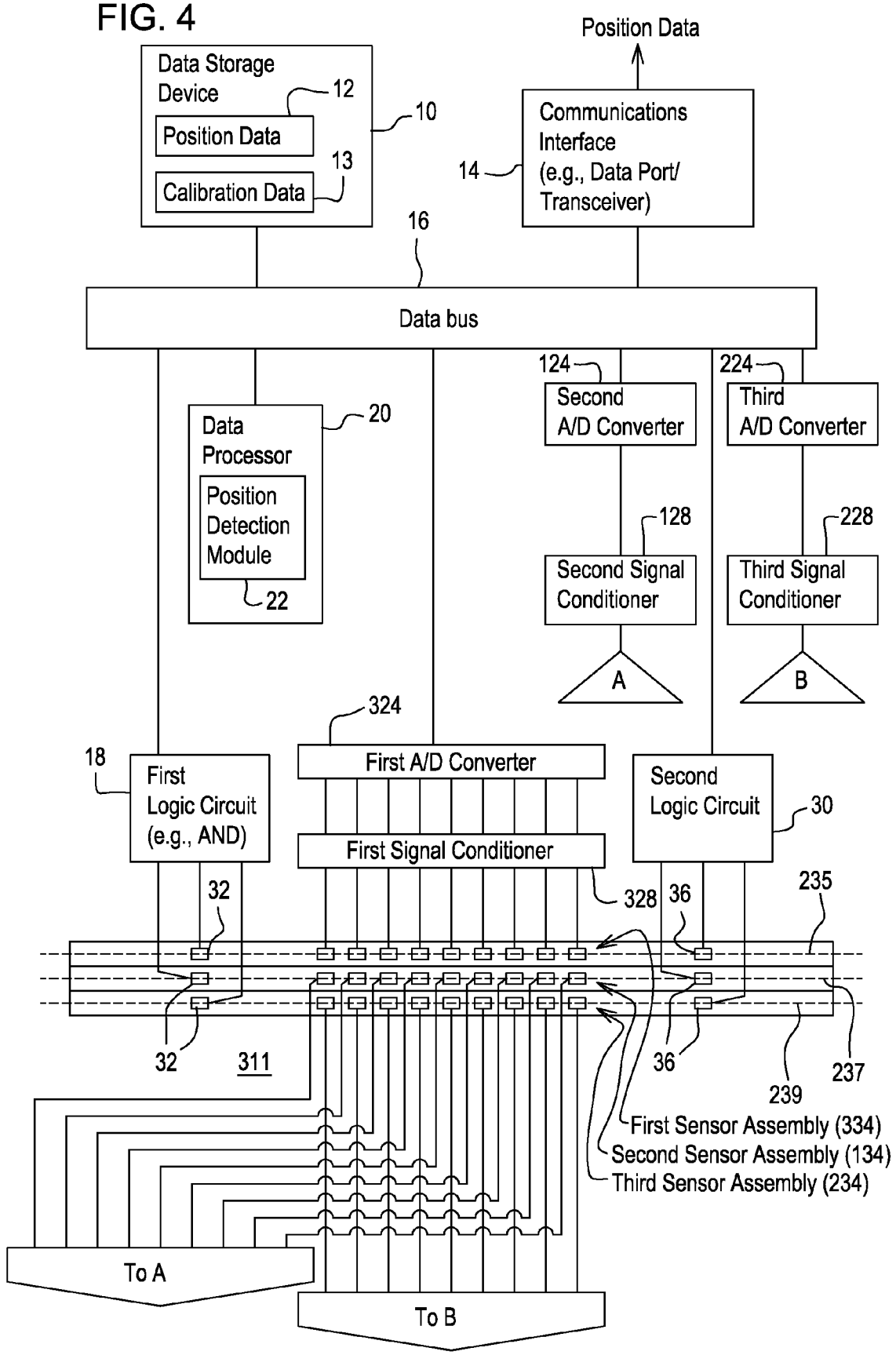
FIG. 4 is a block diagram of another embodiment of a system for determining the position of a movable member.

The sensing system 311 of FIG. 4 is similar to the sensing system 211 of FIG. 3, except the sensing system 311 of FIG. 4 further comprises each sensor assembly 34 associated with a corresponding different signal conditioning circuit (328, 128, or 228) and a different analog-to-digital converter (324, 124 or 224). Like reference numbers in FIG. 3 and FIG. 4 indicate like elements.

In FIG. 4, a first sensor assembly 334 may be coupled to first signal conditioner 328. A second sensor assembly 134 is coupled to a second signal conditioner 128. A third sensor assembly 234 is coupled to a third signal conditioner 228. The first analog-to-digital converter 324, the second analog-to-digital converter 124 and the third analog-to-digital converter 224 are coupled to the data bus 16.

In FIG. 4, the first row 235 comprises a first magnetic sensor 32, the first sensor assembly 334, and a second magnetic sensor 36. The second row 237 comprises a first magnetic sensor 32, the second sensor assembly 134, and a second magnetic sensor 36. The third row 237 comprises a first magnetic sensor 32, the third sensor assembly 234, and a second magnetic sensor 34. Further, each row (235, 237 and 239) of the sensors may have one or more of the following features for redundancy or enhanced reliability: (a) a separate connector, (b) a separate wire harness, (c) a separate power supply circuit, and (d) a separate controller or data processor.

In an alternate embodiment, multiple data processors 20 or one data processor per corresponding analog-to-digital converter could be used.

The sensing system (11, 111, 211 or 311) is well suited for determining the position of a hydraulic cylinder for steering of heavy equipment, agricultural, forestry, construction, or mining equipment. Further, the sensing system 11 may be used with a hydraulic cylinder associated with a boom or bucket of equipment to precisely control the movement or position of the boom or a bucket.

Having described the preferred embodiment, it will become apparent that various modifications can be made without departing from the scope of the invention as defined in the accompanying claims.

The following is claimed:

1. A system for determining the position of a movable member with respect to a fixed member, the system comprising:
   a movable member capable of axial movement within a range of axial positions;
   a first magnet secured to the movable member at a first axial position and associated with a first magnetic field;
   a secondary magnet secured to the movable member at a secondary axial position and associated with a secondary magnetic field;
   a sensor assembly comprising magnetic sensors arranged in an array on a fixed member, the array extending along a direction of the axial movement, wherein the array is arranged in a generally linear series with each magnetic sensor interspaced approximately a uniform amount from an adjacent magnetic sensor in the array;
   a first magnetic sensor spaced apart from the sensor assembly on the fixed member such that the first magnetic sensor detects the first magnetic field of the first magnet in a first state and an absence of the first magnetic field in a second state; and
   a data processor for determining an axial position of the moveable member based on at least one of the first magnetic field and a secondary magnetic field sensed by the sensor assembly.

2. The system according to claim 1 wherein a shift between the first state and the second state of the first magnetic sensor indicates at least one of a direction or magnitude of displacement of the movable member with respect to the fixed member.

3. The system according to claim 1 wherein the data processor uses at least one of a magnitude and an orientation of the magnetic field detected by each magnetic sensor in the sensor assembly to determine the axial position of the movable member with respect to the fixed member.

4. The system according to claim 1 wherein the magnetic field sensors of the sensor assembly comprise analog magnetic sensors.

5. The system according to claim 1 wherein the first magnetic sensor comprises a digital magnetic field sensor.

6. The system according to claim 1 further comprising:
   a signal conditioning circuit coupled to the sensor assembly, the signal conditioning circuit amplifying the sensor signals to fall within a certain amplitude range and filtering noise from the sensor signals.

7. The system according to claim 1 further comprising:
   a data storage device for storing reference magnitude and angle data for the magnetic fields associated with known axial positions of the movable member;
   a position detection module for comparing the observed magnitude and angle data for at least one of the magnetic fields to identify a match between the observed magnitude and angle data and the reference magnitude and angle data; the position detection module capable of identifying the axial position of the movable member associated with the match.

8. A system for determining the position of a movable member, the system comprising:
   a movable member capable of axial movement within a range of axial positions;

a first magnet secured to the movable member at a first axial position and associated with a first magnetic field;

a second magnet secured to the movable member at a second axial position and associated with a second magnetic field;

a third magnet secured to the movable member at an intermediate axial position between the first axial position and the second axial position, the third magnet associated with a third magnetic field;

a sensor assembly comprising analog magnetic sensors arranged in an array, the array extending along a direction of the axial movement, the sensor assembly aligned with the intermediate axial position of a movable member when the movable member is in an intermediate position within the range of axial positions, wherein the array is arranged in a generally linear series with each magnetic sensor interspaced approximately a uniform amount from an adjacent magnetic sensor in the array;

a first magnetic sensor spaced apart from the sensor assembly such that the first magnetic sensor detects the first magnetic field when the movable member is in the intermediate position, the first magnetic sensor having a first state indicative of one direction of displacement of the movable member;

a second magnetic sensor spaced apart from the sensor assembly such that the second magnetic sensor detects a second magnetic field when the movable member is in the intermediate position, the second magnetic sensor having a second state indicative of an opposite direction of displacement of the movable member; and a data processor for determining an axial position of the moveable member based on at least one of three magnetic fields sensed by the sensor assembly and the states of the first and second magnetic sensors.

9. The system according to claim 8 wherein the first magnetic sensor comprises a digital magnetic field sensor and wherein the second magnetic sensor comprises a digital magnetic field sensor.

10. The system according to claim 8 wherein for a small displacement of the movable member from the intermediate position, the first state and the second state are active, indicating a detection of the first magnetic field and the second magnetic field.

11. The system according to claim 8 wherein for a larger displacement of the movable member from the intermediate position, one of the first state and the second state are active and one of the first state and the second state are inactive.

12. The system according to claim 8 wherein the sensor assembly is aligned for detection of the first magnetic field when the movable member approaches one end within the range of axial positions.

13. The system according to claim 8 wherein the sensor assembly is aligned for detection of the second magnetic field when the movable member approaches another end within the range of axial positions.

* * * * *